United States Patent
Sotom et al.

(10) Patent No.: US 6,334,010 B1
(45) Date of Patent: Dec. 25, 2001

(54) PROTECTED OPTICAL SWITCHING MATRIX

(75) Inventors: Michel Sotom, Paris; Claude Lebouetté, Bretigny sur Orge; François-Xavier Ollivier, Guibeville; Guy Franceus, Cheptainville, all of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/291,323

(22) Filed: Apr. 15, 1999

Related U.S. Application Data
(60) Provisional application No. 60/082,509, filed on Apr. 21, 1998.

(51) Int. Cl.[7] ................................. G02B 6/43; H04J 14/02
(52) U.S. Cl. ............................................. 385/17; 359/128
(58) Field of Search ................................. 385/17, 16, 24; 359/128, 117

(56) References Cited

U.S. PATENT DOCUMENTS

| | | | |
|---|---|---|---|
| 5,208,691 | * | 5/1993 | Nishio ................................. 359/117 |
| 5,671,304 | * | 9/1997 | Duguay ................................. 385/17 |
| 5,754,320 | * | 5/1998 | Watanabe et al. .................... 359/117 |

* cited by examiner

*Primary Examiner*—Jon Henry
(74) *Attorney, Agent, or Firm*—Sughrue, Mion, Zinn, Macpeak & Seas, PLLC

(57) ABSTRACT

A protected optical switch matrix having N inputs and N outputs and including an optical switching fabric (S2–S2'), an input interface (S1) performing wavelength conversion and an output interface (S3) performing wavelength filtering. The input interface (S1) and the output interface (S3) are protected by redundancy provided by r redundant units for E working units where r is a number very much less than E.

5 Claims, 13 Drawing Sheets

PROTECTED OPTICAL SWITCHING MATRIX

This application claims benefit of Provisional Application Ser. No. 60/082,509 filed Apr. 21, 1998.

BACKGROUND OF THE INVENTION

The invention concerns a protected optical switching matrix which can be used in particular as a cross connect switch for optical links.

A prior art high capacity optical switching matrix has been made from an array of lower capacity optical switches. The switches can all be of the space switching type, all of the spectral switching type or a combination of the two types.

To protect a matrix of the above kind, i.e. to keep it working without loss of capacity if any of the switches fails, duplicating each stage of the network with an identical stage that is not normally used, but which is used in place of the stage that has failed if any of the switches constituting it fails, is known per se. A protection system of the above kind is based on so-called 1 for 1 redundancy, in other words one redundant unit for each working unit. Its main drawback is that it doubles the cost of the matrix.

A protected matrix can also be modified to increase its capacity by adding matrix units without interrupting service.

In the prior art there are various architectures for an optical switching matrix:

A first prior art architecture includes a plurality of spatial switching matrix units connected in cascade, using the Clos architecture, for example. The drawbacks of this type of matrix are:
  High insertion losses, which cannot be compensated simultaneously in both of the ranges of optical wavelengths routinely used: 1 300 nm and 1 550 nm. This limits the maximum size of the optical matrices that can be made using this architecture.
  Protecting the matrix necessarily entails the use of 1 for 1 redundancy for the entire matrix, which is costly.
  The number of matrix units that must connected in cascade is high, leading to high cost.
A second prior architecture includes a plurality of spectral switching matrix units or a combination of spatial switching matrix units and spectral switching matrix units. This latter combination can produce a large matrix but the second architecture also has the disadvantage of necessitating 1 for 1 redundancy for the entire matrix if it is to be protected.

SUMMARY OF THE INVENTION

The aim of the invention is to propose a protected optical matrix that is less costly to implement.

The invention consists in a protected optical switch matrix having N inputs and N outputs and including an optical switching fabric, an input interface performing wavelength conversion and an output interface performing wavelength filtering, characterized in that the input interface and the output interface are protected by redundancy provided by r redundant units for E working units where r is a number very much less than E.

The matrix so characterized is less costly than a prior art protected matrix because the cost of the input and output interfaces is increased only in the proportion r/E rather than doubled.

In a first embodiment the input interface includes at least one group of E working wavelength converters and r redundant converters which are all tuned permanently to the same wavelength.

In a second embodiment the input interface includes at least one group of E working wavelength converters and r redundant converters which can all be tuned in the same band of wavelengths.

In a third embodiment the input interface includes at least one group of E working wavelength converters which are all tuned permanently to E respective different wavelengths and r redundant converters which can all be tuned to any one of those E wavelengths.

In a fourth embodiment the output interface includes at least one group of E working wavelength filters and r redundant converters which can all be tuned to the same range of wavelengths.

In a fifth embodiment the output interface includes at least one group of E working wavelength filters and r redundant converters which are all tuned permanently to the same wavelength.

In a sixth embodiment the output interface includes at least one group of E working wavelength filters which are all tuned permanently to E respective different wavelengths and r redundant converters which can all be tuned to any one of those E wavelengths.

BRIEF DESCRIPTION OF THE DRAWINGS

The invention will be more clearly understood and other features of the invention will become apparent during the course of the following description and from the accompanying drawings.

DETAILED DESCRIPTION OF THE INVENTION

Figure 1:
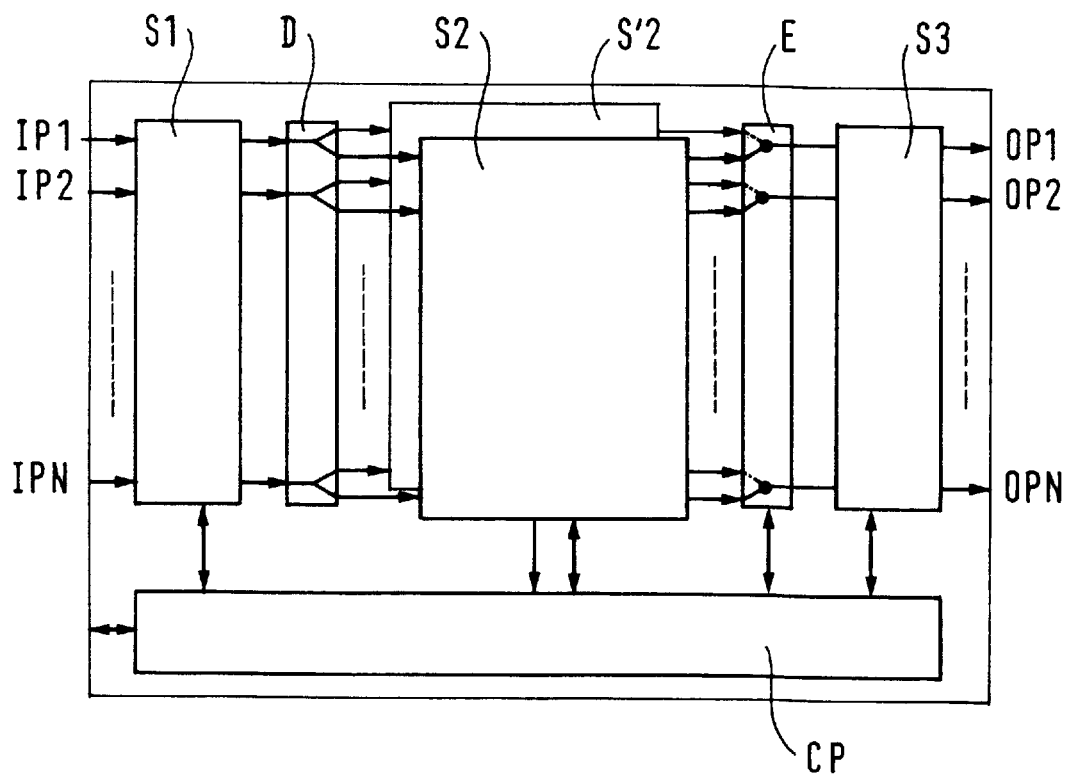
FIG. 1 is a block diagram of one example of a matrix in accordance with the invention.

The block diagram shown in FIG. 1 is that of one example of a matrix with N inputs and N outputs, an input interface S1, a switching fabric S2–S2' and an output interface S3. N=128, for example. In this example, the switching fabric S2–S2' has only one stage, consisting of a single switching matrix, but the invention also applies if the switching fabric includes an array of matrices divided into a plurality of stages.

The input interface S1 comprises a first stage having N input ports IP1, IP2, . . . , IPN receiving respective optical signals on carriers which all have a wavelength of 1 310 nm, for example. It has N outputs which are coupled to the switching fabric S2–S2' of the matrix by a group D of N optical dividers. The switching fabric S2–S2' comprises a second stage including two identical matrices S2 and S2' in parallel to protect the switching fabric in the conventional way, that is to say using 1 for 1 redundancy.

The group D of optical dividers divides the optical signals from the first stage S1 and applies them in parallel to the N inputs of each of the two matrices S2 and S2'. The two matrices S2 and S2' are of the spectral switching or mixed spatial-spectral switching type. Each has N outputs. The output interface comprises a third stage S3 having N inputs which are coupled to the second stage S2–S2' by a group E of N optical switches each having two optical inputs and one output, the group E of switches being electrically controlled to transmit the optical signals supplied either by the N outputs of the matrix S2 or by the N outputs of the matrix S2'.

The functions of the first stage S1 are:
  to extract certain data of the SONET or SDH overhead for managing transmission errors, monitoring performance and supervising connectivity, and
  to match and regenerate the optical signals (regeneration, reshaping and retiming).

It regenerates the optical signals by conventional electronic processing and then retransmits them on a plurality of different wavelengths $\lambda 1, \ldots, \lambda p$ which are all in the same band, for example a band centered on 1 550 nm, which is appropriate for optical amplifiers downstream of them in the second stage. This plurality of different wavelengths enables spectral switching in the second stage. The first stage S1 is described in more detail hereinafter and is protected by r for N redundancy, where r is very much less than N.

The third stage S3 filters the wavelengths of the signals from the second stage S2–S2' to eliminate noise and then converts the signals so that they all have the same wavelength, for example 1 310 nm. It also regenerates the signals, if necessary. The third stage S3 has N outputs that constitute the output ports OP1, ..., OPN of the matrix. The third stage S3 is described in more detail hereinafter and is protected by r for N redundancy, where r is very much less than N. The means for converting the wavelength to 1 310 nm and where applicable for regenerating the signals in the third stage S3 are conventional and for simplicity are therefore omitted from the description of the embodiments of the invention.

A control platform CP controls the components of the three stages S1, S2–S2', S3 and of the group D in accordance with signaling signals, in particular to command switching from matrix S2 to matrix S2' or vice versa.

Figure 2A:
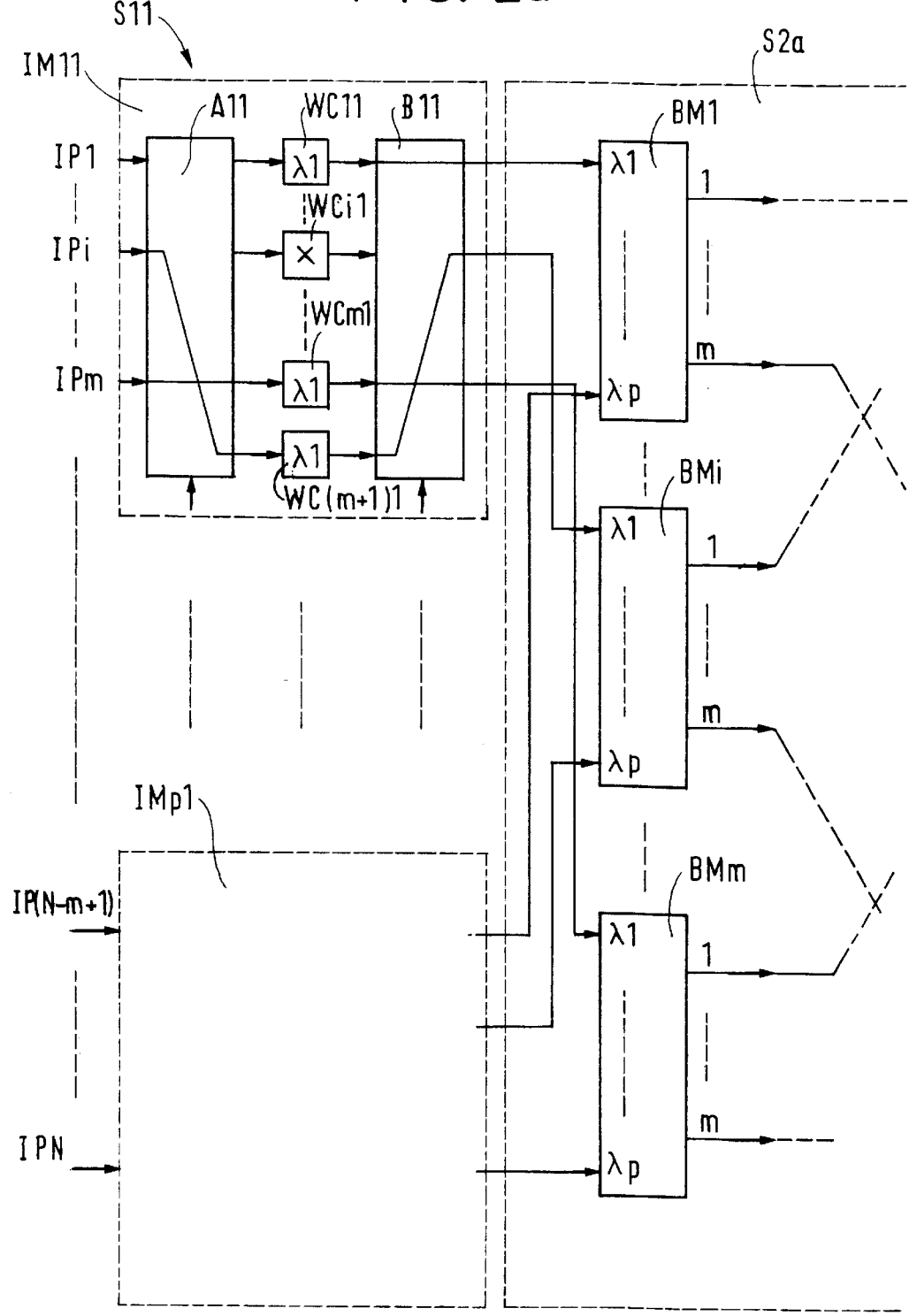
FIGS. 2a and 2b are a more detailed block diagram of a first embodiment of that example.
Figure 2B:
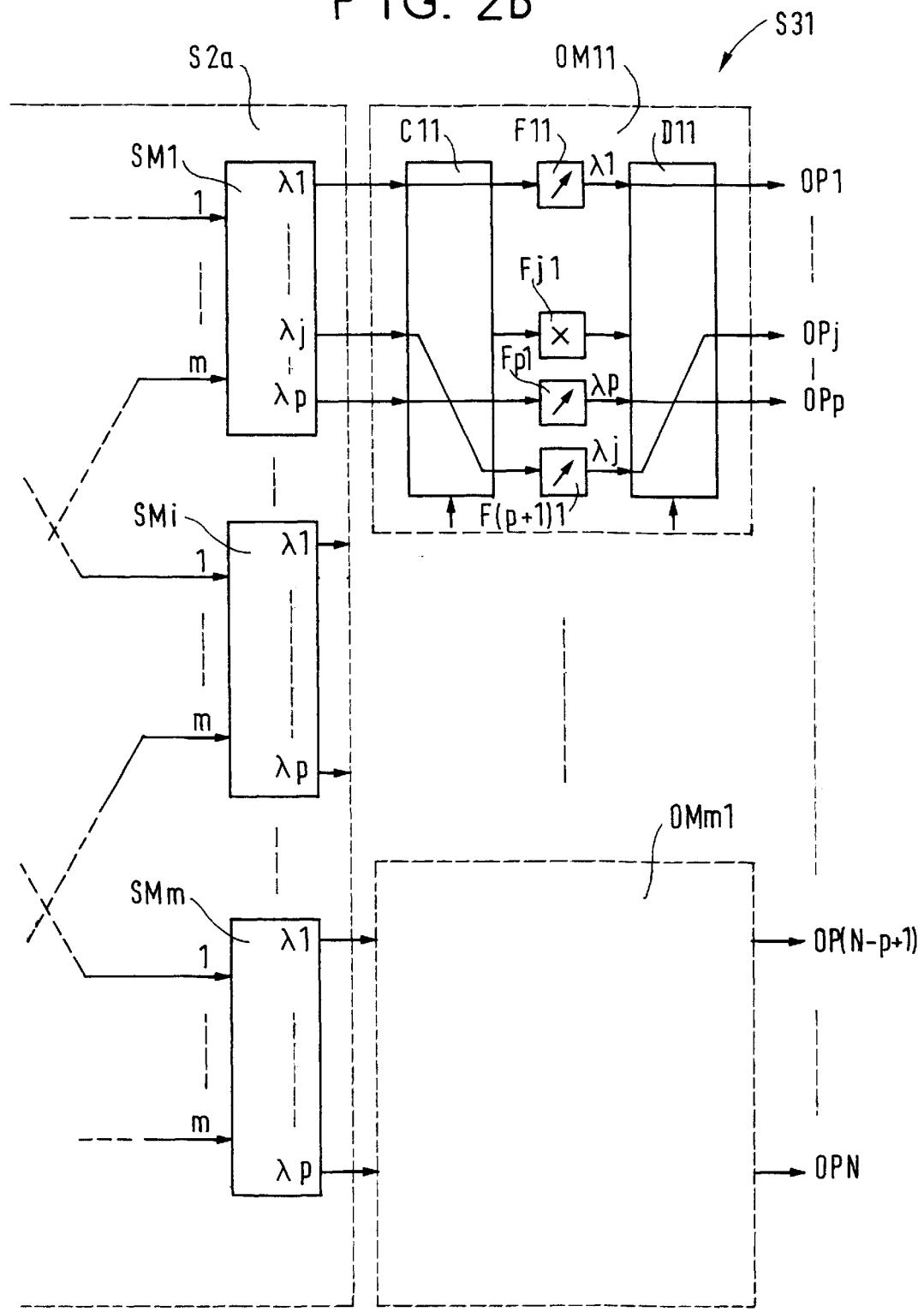

FIGS. 2a and 2b show a more detailed block diagram of a first embodiment of the above example, omitting the matrix S2', the group D, the group E and the control platform CP for greater clarity. In this first embodiment the switching fabric S2–S2' includes a mixed spectral-spatial switching matrix S2a.

The matrix S2a comprises:

A first stage made up of m broadcast modules BM1, ..., BMm which are implemented in the conventional way.

Each broadcast module has m outputs and p inputs each of which receives an optical signal having a respective fixed carrier wavelength $\lambda 1, \ldots, \lambda p$ which is specific to each input of the module concerned, m and p being two integers chosen so that N=m×p. For example, possible values for N=128 are p=16 and m=8.

A second stage made up of p selection modules SM1, ..., SMm which are implemented in the conventional way. Each selection module SM1, ..., SMm has M inputs connected to a respective output of each of the m broadcast modules BM1, ..., BMm and p outputs each of which supplies an optical signal having a respective fixed carrier wavelength $\lambda 1, \ldots, \lambda p$ specific to each output of the module.

The m selection modules SM1, ..., SMm are identical. Each has p outputs connected to p respective inputs of the third stage S31 via the group D of switches that is not shown.

Each module SM1, ..., SMm includes an optical amplifier, not shown, at each output to compensate the attenuation caused by the matrix. The amplifiers enable a matrix to be implemented with a large number of stages and therefore with a high capacity. Each amplifier has a bandwidth centered on 1 550 nm and including all the wavelengths $\lambda 1, \ldots, \lambda p$ emitted by the first stage S1.

In the embodiment shown in FIGS. 2a and 2b the first stage S11 comprises p identical modules IM11, ..., IMp1. For example, module IM11 includes:
  an input switch A11 controlled by an electrical signal supplied by the control platform CP, not shown,
  m+1 wavelength converters WC11, ..., WC(m+1)1 having m+1 inputs connected to m+1 respective outputs of the input switch A11 and m+1 outputs, all the converters of the same module emitting the same respective fixed wavelength $\lambda 1, \ldots, \lambda p$ for the modules IM11, ..., IMp1, and
  an output switch B11 controlled by an electrical signal supplied by the control platform CP.

The input switch A11 has m inputs and m+1 outputs. Its m inputs constitute the ports IP1, ..., IPm. If all the converters WC11, ..., WCm1 are working correctly, it is commanded to connect its input k to its output k for k=1 to m. Its m+1 outputs are connected to the respective m inputs of the m+1 converters WC11, ..., WC(m+1)1.

The output switch B11 has m+1 inputs and m outputs. Its m+1 inputs are connected to m+1 respective outputs of the m+1 converters WC11, ..., WC(m+1)1 and its m outputs are connected to a respective input of each of the m broadcast modules BM1, ..., BMm of the matrix S2a via the group D, not shown. If all the converters are working correctly, it is commanded to connect its input k to its output k for k=1 to m.

There is a redundant converter WC(m+1) identical to the m working converts WC11, ..., WCm1. If converter Wci1, for example, fails the control platform CP commands the switches A11 and B11 to connect the input port IPi to the input of the redundant converter WC(m+1) 1 instead of to the input of the failed converter WCi1 and to connect the output i of switch B11 to the output of the redundant converter WC(m+1) 1 instead of to the output of the failed converter WCi1.

The stage S31 comprises m identical modules OM11, ..., OMm1. For example, the module OM11 includes:
  an input switch C11 controlled by an electrical signal supplied by the control platform CP,
  p+1 filters for wavelengths F11, ..., F(p+1)1 which can be tuned individually under the control of an electrical signal supplied by the control platform CP to eliminate noise, and
  an output switch D11 controlled by an electrical signal supplied by the control platform.

The input switch C11 has p inputs and p+1 outputs. Its p+1 outputs are connected to p+1 respective inputs of the filters F11, ..., F(p+1)1. If all the filters F11, ..., Fp1 are working correctly it is commanded to connect its input k to its output k for k=1 to p.

The output switch D11 has p+1 inputs and p outputs, the p outputs constituting the respective output ports OP1, ..., OPp of the matrix and its p+1 inputs being connected to a respective output of the p+1 tunable filters F11, ..., F(p1)1. If all the filters F11, ..., Fp1 are working correctly it is commanded to connect its input k to its output k for k=1 to A.

The filters F11, ..., F(p+1)1 are respectively tuned to the wavelength $\lambda 1, \ldots, \lambda p$ to eliminate noise. There is a redundant filter F(p+1)1 identical to the p working filters F11, . . . , Fp1. If filter Fj1, for example, fails the control platform CP commands the switches C11 and D11 to connect the output j of the selection module SM1 to the input of the redundant filter F(p+1)1 instead of to that of the failed filter Fj1 and to connect the output j of the switch D1, constituting the output port Opj, to the output of the redundant converter F(p+1)1 instead of to that of the failed converter Fj1.

Figure 3A:
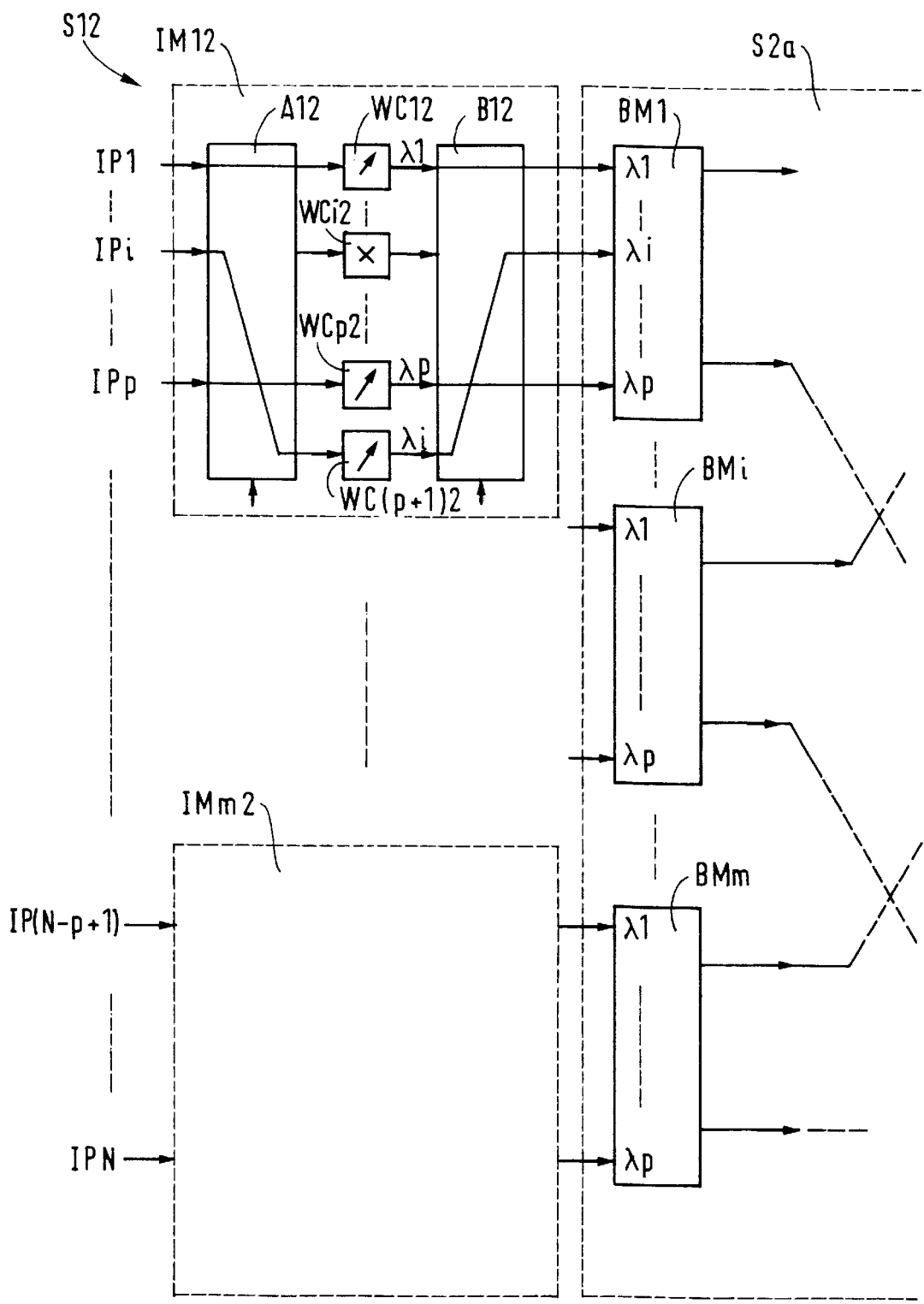
FIGS. 3a and 3b are a more detailed block diagram of a second embodiment of that example.
Figure 3B:
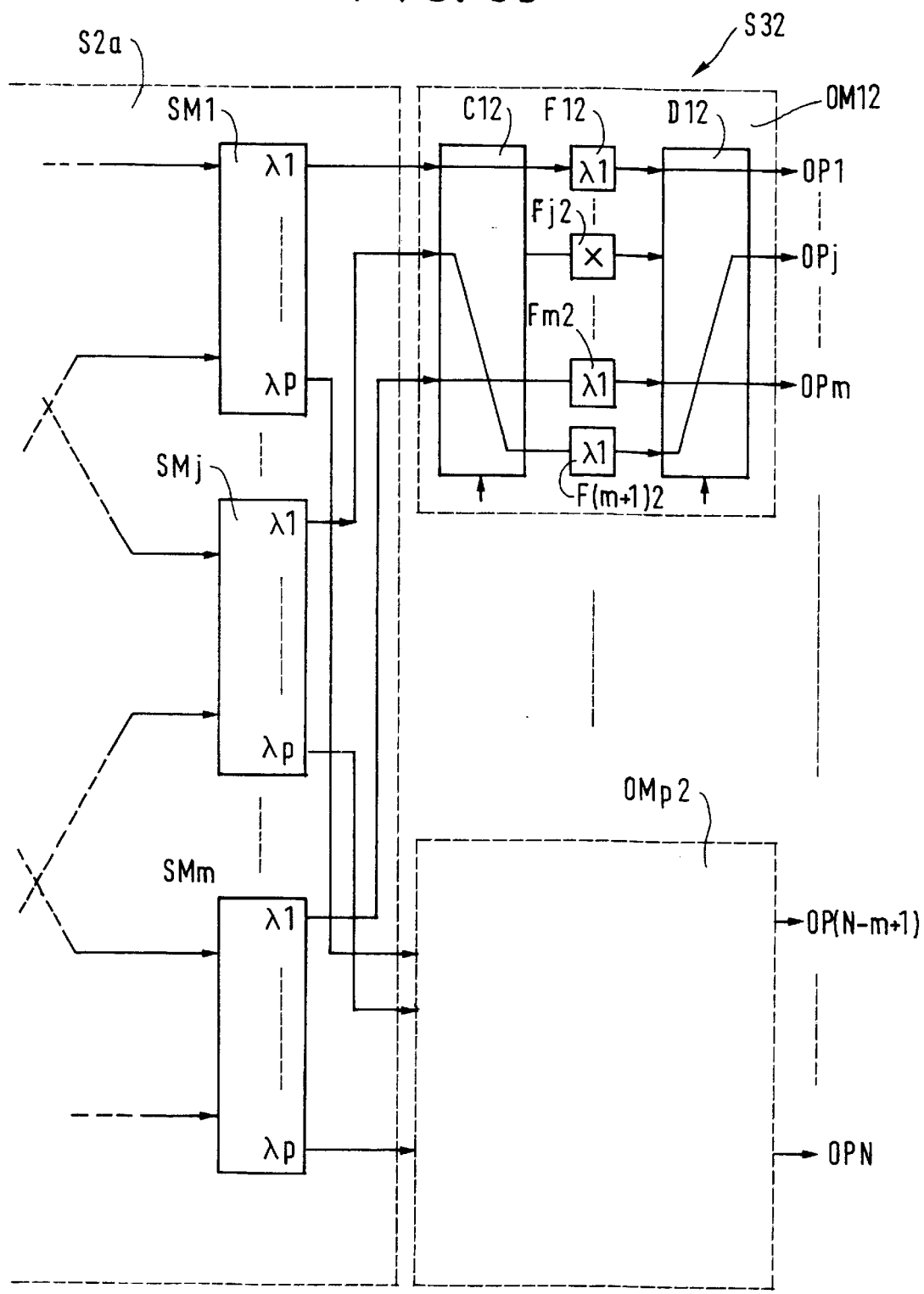

FIGS. 3a and 3b show a more detailed block diagram of a second embodiment of the above example, omitting the matrix S2a, the group D, the group E and the control platform CP for greater clarity. The matrix S2a constituting the second stage is the same as the one described above.

The first stage S12 of the matrix comprises m identical modules IM12, . . . , IMm2. For example, the module IM12 includes:

an input switch A12 controlled by an electrical signal supplied by the control platform CP, not shown, p+1 wavelength converters WC12, . . . , WC(p+1)2 which can be tuned individually under the control of an electrical signal supplied by the control platform CP, and an output switch B12 controlled by an electrical signal supplied by the control platform CP.

The input switch A12 has p inputs and p+1 outputs. Its p+1 outputs are connected to p+1 respective inputs of the p+1 wavelength converters WC12, . . . , WC(p+1)2. If all the converters WC12, . . . , WCp2 are working correctly it is commanded to connect its input k to its output k for k=1 to p.

The tunable converters WC12, . . . , WC(p+1)2 have p+1 outputs connected to the p+1 inputs of the switch B12. The p converters of the same module emit p respective different wavelengths ($\lambda 1, \ldots, \lambda p$).

The output switch B12 has p+1 inputs and p outputs. Its p outputs are connected to p respective inputs of the module BM1 of the matrix S2a via the group D, not shown. If all the converters W12, . . . , WCp2 are working correctly it is commanded to connect its input k to its output k for k=1 to p.

There is a redundant converter WC(p+1)2 identical to the p working converters WC12, . . . , WCp2. If the converter WCi2, for example, fails the control platform CP commands the switches A12 and B12 to connect the input port IPi to the input of the redundant converter WC(p+1)2 instead of to the input of the failed converter WCi2 and to connect the output i of the switch B12 to the output of the redundant converter WC(p+1)2 instead of to the output of the failed converter WCi2. The control platform CP tunes the redundant converter WC(p+1)2 to the wavelength $\lambda i$ that the failed converter WCi2 was using before it failed.

The third stage S32 comprises p modules OM12 . . . , OMp2 each of which is allocated a respective different wavelength S1, . . . , $\lambda p$. For example, the module OM12 includes:

an input switch C12 controlled by an electrical signal supplied by the control platform CP, m+1 filters F12, . . . , F(m+1)2, all of which are permanently tuned to a fixed wavelength $\lambda 1$ specific to the module OM12 to eliminate noise, and an output switch D12 controlled by an electrical signal supplied by the control platform CP.

The input switch C12 has m inputs and m+1 outputs. Its m inputs are connected to a respective output of each of the m output modules SM1, . . . , SMm of the matrix S2a. The m filters F12, . . . , F(m+1)2 have m+1 inputs connected to m+1 respective outputs of the input switch C12 and m+1 outputs. If all the filters F12, . . . , Fm2 are working correctly the switch C12 is commanded to connect its input k to its output k for k=1 to p.

The output switch D12 has m+1 inputs and m outputs, the m outputs constituting m respective output ports OP1, . . . , OPm of the matrix. If all the filters F12, . . . , Fm2 are working correctly it is commanded to connect its input k to its output k for k=1 to p.

There is a redundant filter F(m+1)2 identical to the working converters F12, . . . , Fm2. If the filter Fj2, for example, fails the control platform CP commands the switches C12 and D12 to connect the output j of the selection module Smj to the input of the redundant filter F(m+1)2 instead of to that of the failed filter Fj2 and to connect the output j of the switch D12, constituting the output port Opj, to the output of the redundant converter F(m+1)2 instead of to that of the failed converter Fj2.

Figure 4A:
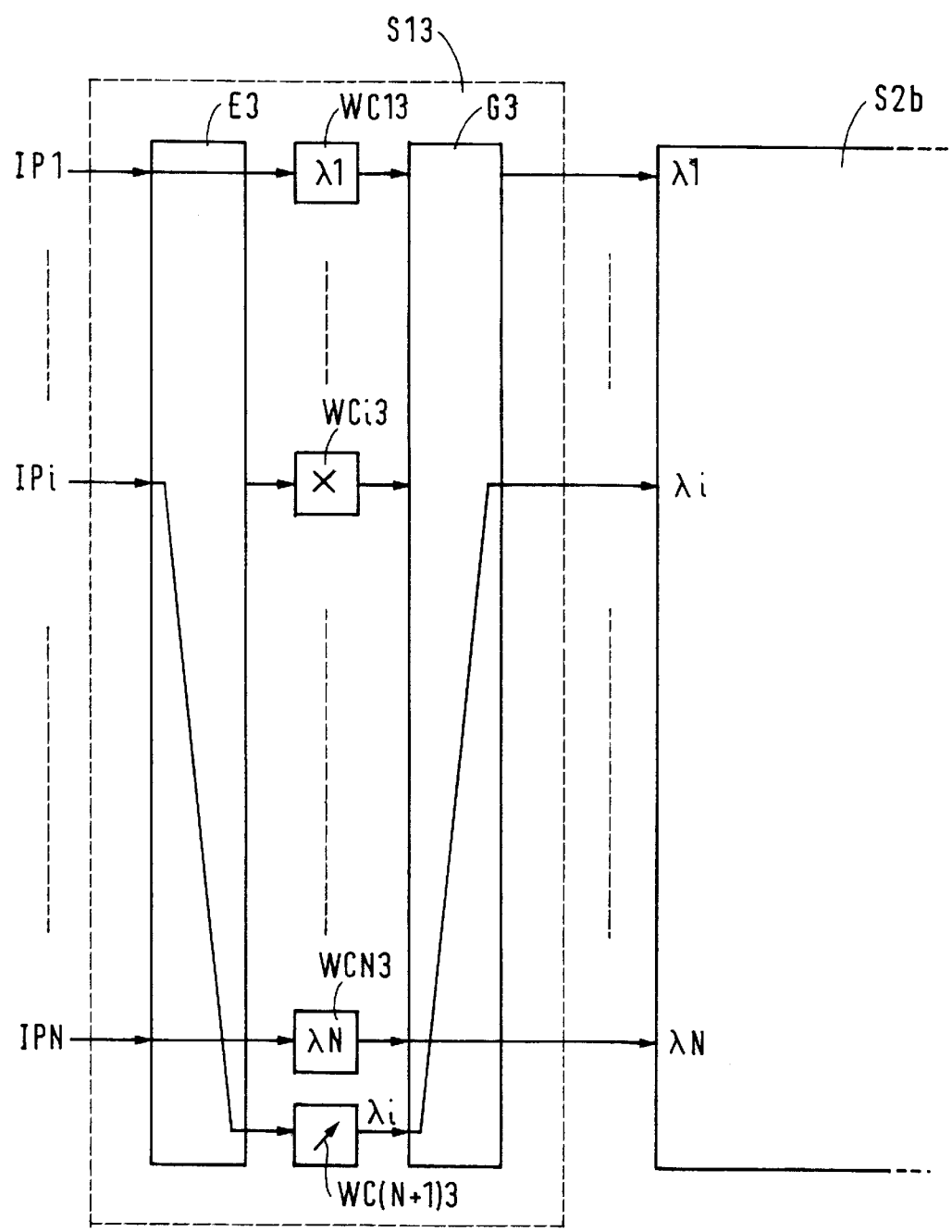
FIGS. 4a and 4b are a more detailed block diagram of a third embodiment of that example.
Figure 4B:
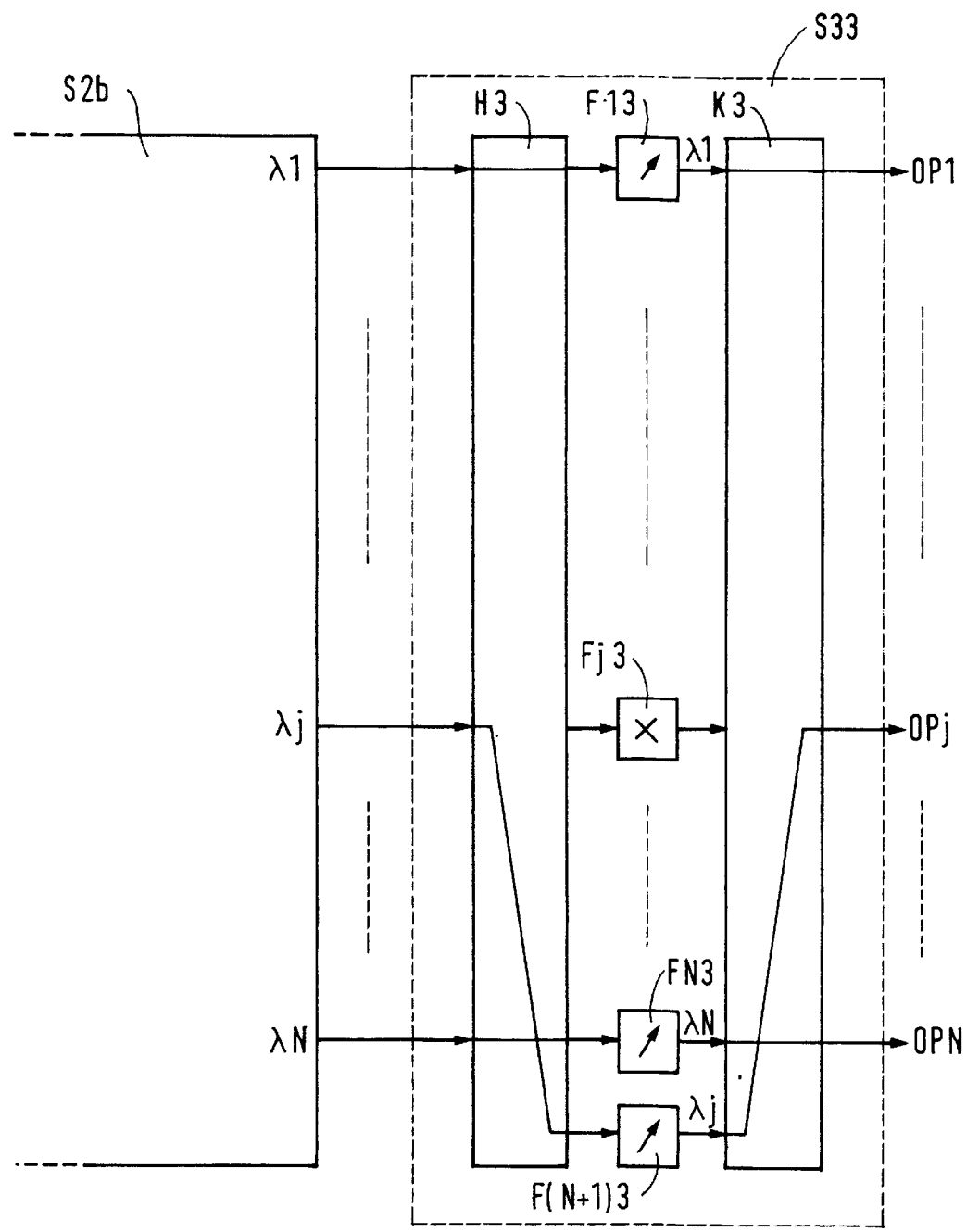

FIGS. 4a and 4b show a more detailed block diagram of a third embodiment of the above example. In this third embodiment the switching fabric S2–S2' includes a conventional and purely spectral switching matrix S2b protected by an identical matrix, not shown. The group D, the group E and the control platform CP are not shown for greater clarity. The input signals have a wavelength of 1 310 nm, for example, and the matrix S2b is adapted to switch signals having wavelengths $\lambda 1, \ldots, \lambda N$ in a band centered on 1 550 nm, for example.

The first stage S13 includes:

an input switch E3 controlled by an electrical signal supplied by the control platform CP, not shown, N+1 wavelength converters WC13, . . . , WCN3 emitting respective fixed wavelengths $\lambda 1, \ldots, \lambda N$ and a redundant converter WC(N+1)3 that can be tuned to any of those wavelengths, and an output switch G3 controlled by an electrical signal supplied by the control platform CP, not shown.

The input switch E3 has N inputs and N+1 outputs. Its N+1 outputs are connected to N+1 respective inputs of the converters WC13, . . . , WCN3, WC(N+1)3. If all the converters WC13, . . . , WCN3 are working correctly it is commanded to connect its input k to its output k for k=1 to N.

The output switch G3 has N+1 inputs connected to respective outputs of the converters WC13, . . . , WCN3, WC(N+1)3 and N outputs connected to N respective inputs of the matrix S2b. If all the converters W13, . . . , WCN3 are working correctly it is commanded to connect its input k to its output k for k=1 to N.

There is a redundant converter WC(N+1)3 for N working converters WC1, . . . , WCN. It can be tuned in the range $\lambda 1, \ldots, \lambda N$. If the converter WCi3, for example, fails the control platform CP commands the switch E3 to connect the input port IPi to the input of the redundant converter WC(N+1)3 instead of to the input of the failed converter WCi3 and commands the switch G3 to connect the output i of the switch G3 to the output of the redundant converter WC(N+1)3 instead of to the output of the failed converter WCi3.

The third stage S33 includes:

an input switch H3 controlled by an electrical signal supplied by the control platform CP, N+1 identical filters F13, . . . , F(N+1)3 that can be tuned under the control of an electrical signal supplied by the control platform CP, and an output switch K3 controlled by an electrical signal supplied by the control platform CP.

The input switch H3 has N inputs and N+1 outputs. Its N+1 outputs are connected to N+1 respective inputs of the filters F13, ..., F(N+1)3. If all the filters F13, ..., FN3 are working correctly it is commanded to connect its input k to its output k for k=1 to N.

The output switch K3 has N+1 inputs connected to N+1 respective outputs of the filters F13, ..., FN3 and N outputs constituting the respective N output ports OP1, ..., OPN of the matrix.

The filters F13, ..., FN3 are tuned to the respective wavelengths $\lambda 1, \ldots, \lambda N$ to eliminate noise. There is a redundant filter F(N+1)3 for N working filters F13, ..., FN3. If the converter WCj3, for example, fails the control platform CP commands the switches H3 and K3 to connect the input port IPj to the input of the redundant filter F(N+1)3 instead of to the input of the failed filter Fj3 and to connect the output j of the switch K3 to the output of the redundant filter F(N+1)3 instead of to the output of the failed filter Fj3.

Figure 5A:
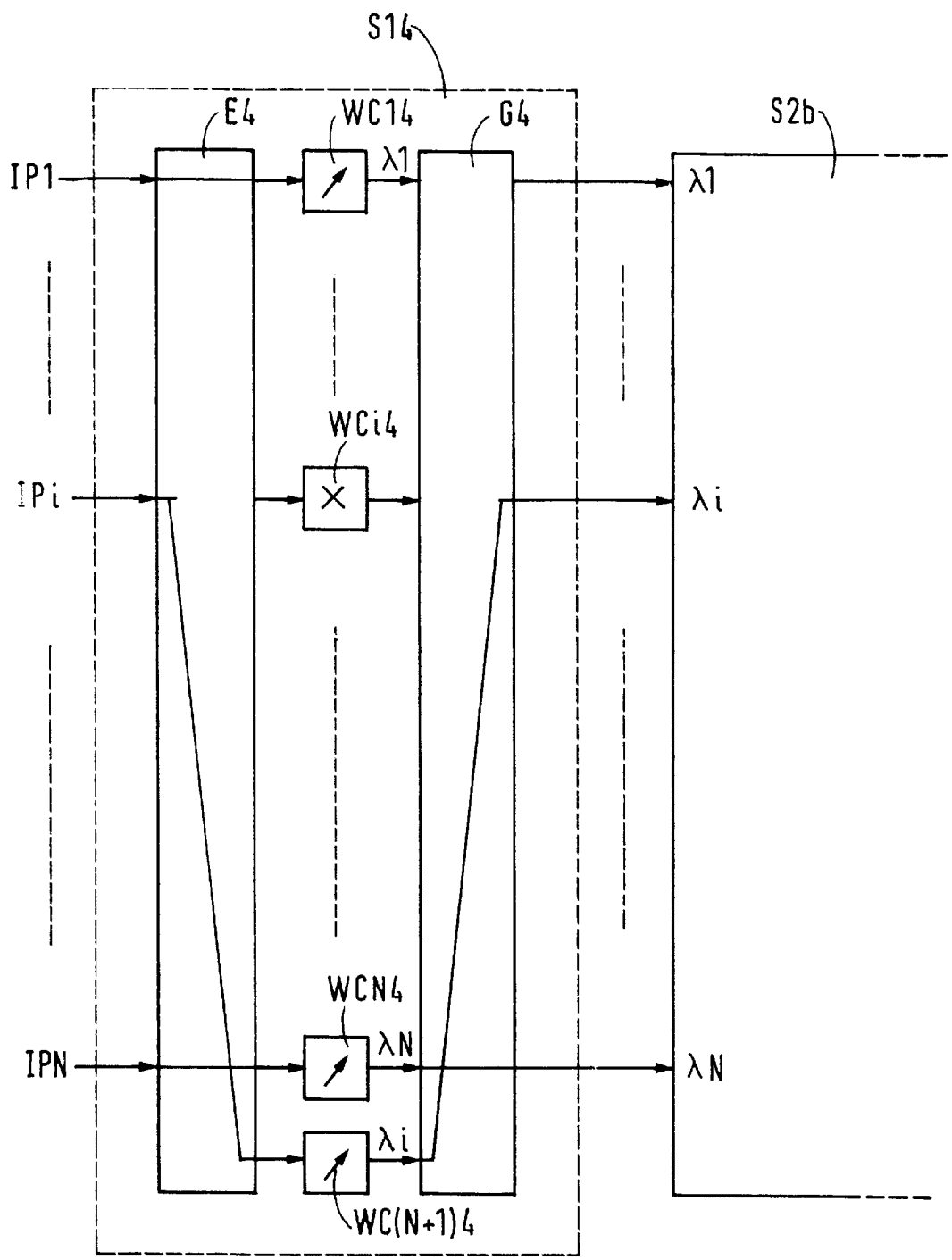
FIGS. 5a and 5b are a more detailed block diagram of a fourth embodiment of that example.
Figure 5B:
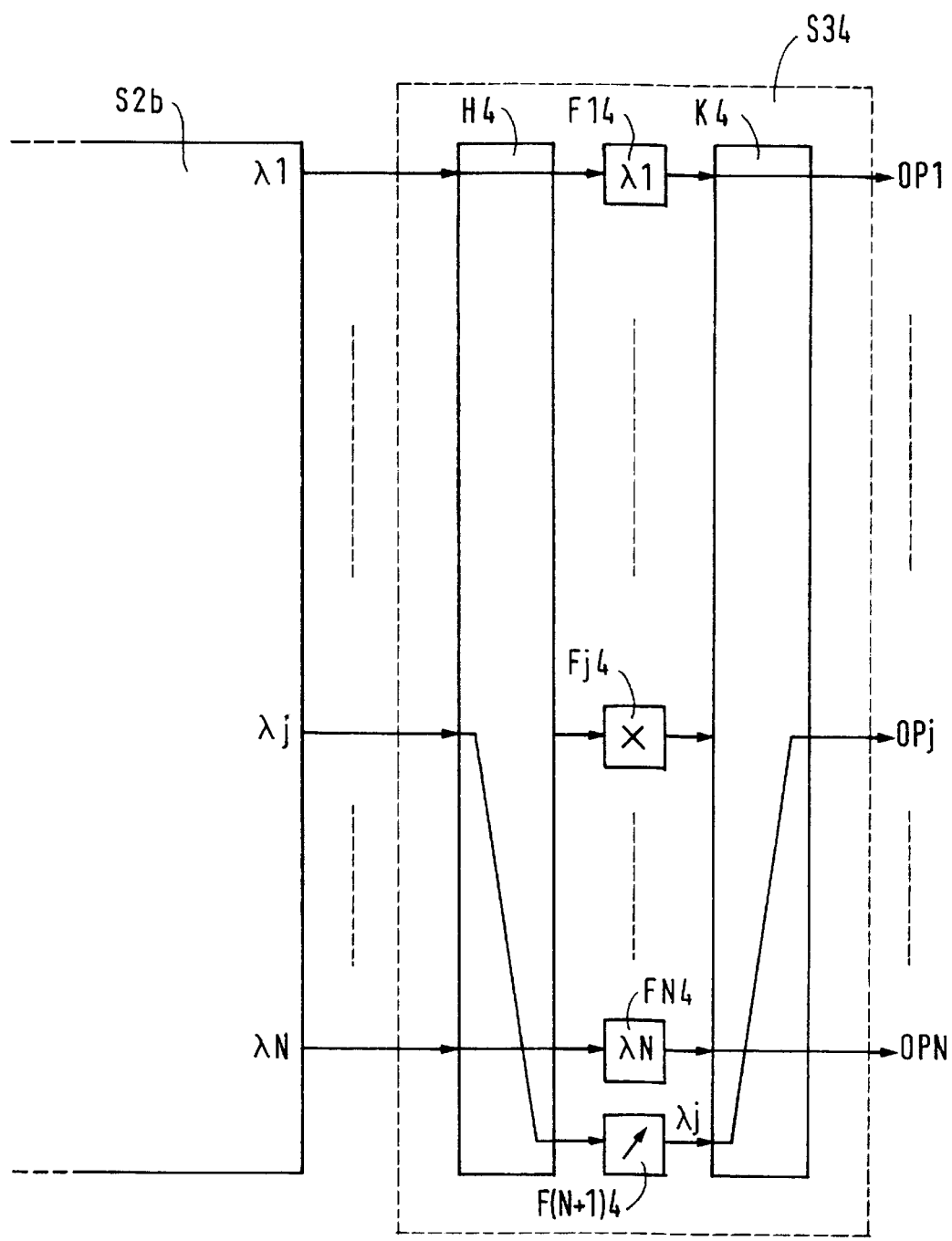

FIGS. 5a and 5b show a more detailed block diagram of a fourth embodiment of the above example. In this fourth embodiment the switching fabric S2–S2' includes a conventional, purely spectral switching matrix S2b protected by an identical matrix, not shown. The group D, the group E and the control platform CP are not shown for greater clarity. The input signals have a wavelength of 1 310 nm, for example, and the matrix S2b is adapted to switch signals having wavelengths $\lambda 1, \ldots, \lambda N$ in a band centered on 1 550 nm, for example.

The first stage S14 includes:
- an input switch E4 controlled by an electrical signal supplied by the control platform CP, not shown,
- N+1 tunable identical wavelength converters WC14, ..., WCN4, WC(N+1)4 which can be tuned to any of the wavelengths $\lambda 1, \ldots, \lambda N$ under the control of an electrical signal supplied by the control platform CP, and
- an output switch G4 controlled by an electrical signal supplied by the control platform CP.

The input switch E4 has N inputs and N+1 outputs. Its N+1 outputs are connected to N+1 respective inputs of the converters WC14, ..., WCN4, WC(N+1)4. If all the converters WC14, ..., WCN4 are working correctly it is commanded to connect its input k to its output k for k=1 to N.

The output switch G4 has N+1 inputs connected to respective outputs of the converters WC14, ..., WCN4, WC(N+1)4 and N outputs connected to N respective inputs of the matrix S2b. If all the converters W14, ..., WCN4 are working correctly it is commanded to connect its input k to its output k for k=1 to N.

The converters are tuned to respective wavelengths $\lambda 1, \ldots, \lambda N$. There is a redundant converter WC(N+1)4 for N working converters WC1, ..., WCN. If the converter WCi4, for example, fails the control platform CP commands the switches E4 and G4 to connect the input port IPi to the input of the redundant converter WC(N+1)4 instead of to the input of the failed converter WCi4 and to connect the input i of the switch G4 to the output of the redundant converter WC(N+1)4 instead of to the output of the failed converter WCi4.

The third stage S34 includes:
- an input switch H4 controlled by an electrical signal supplied by the control platform CP,
- N identical filters F14, ..., FN4 tuned to respective fixed wavelengths $\lambda 1, \ldots, \lambda N$ to eliminate noise and a tunable filter F(N+1)4 which can be tuned to any of those wavelengths under the control of an electrical signal supplied by the control platform CP, and
- an output switch K4 controlled by an electrical signal supplied by the control platform CP.

The input switch H4 has N inputs and N+1 outputs. Its N+1 outputs are connected to N+1 respective inputs of the filters F14, ..., F(N+1)4. If all the filters F14, ..., FN4 are working correctly it is commanded to connect its input k to its output k for k=1 to N.

The output switch K4 has N+1 inputs connected to respective outputs of the N+1 filters F14, ..., F(N+1)4 and N outputs constituting N respective output ports OP1, ..., OPN of the matrix.

There is a redundant tunable filter F(N+1)3 for N fixed tuned filters F13, ..., FN3 which are normally working. If the filter Fj4, for example, fails the control platform cP commands the switches H4 and K4 to connect its input l to the input of the redundant filter F(N+1)4 instead of to the input of the failed filter Fj4 and to connect the input i of the switch K4 to the output of the redundant filter F(N+1)4 instead of to the output of the failed filter Fj4.

Figure 6A:
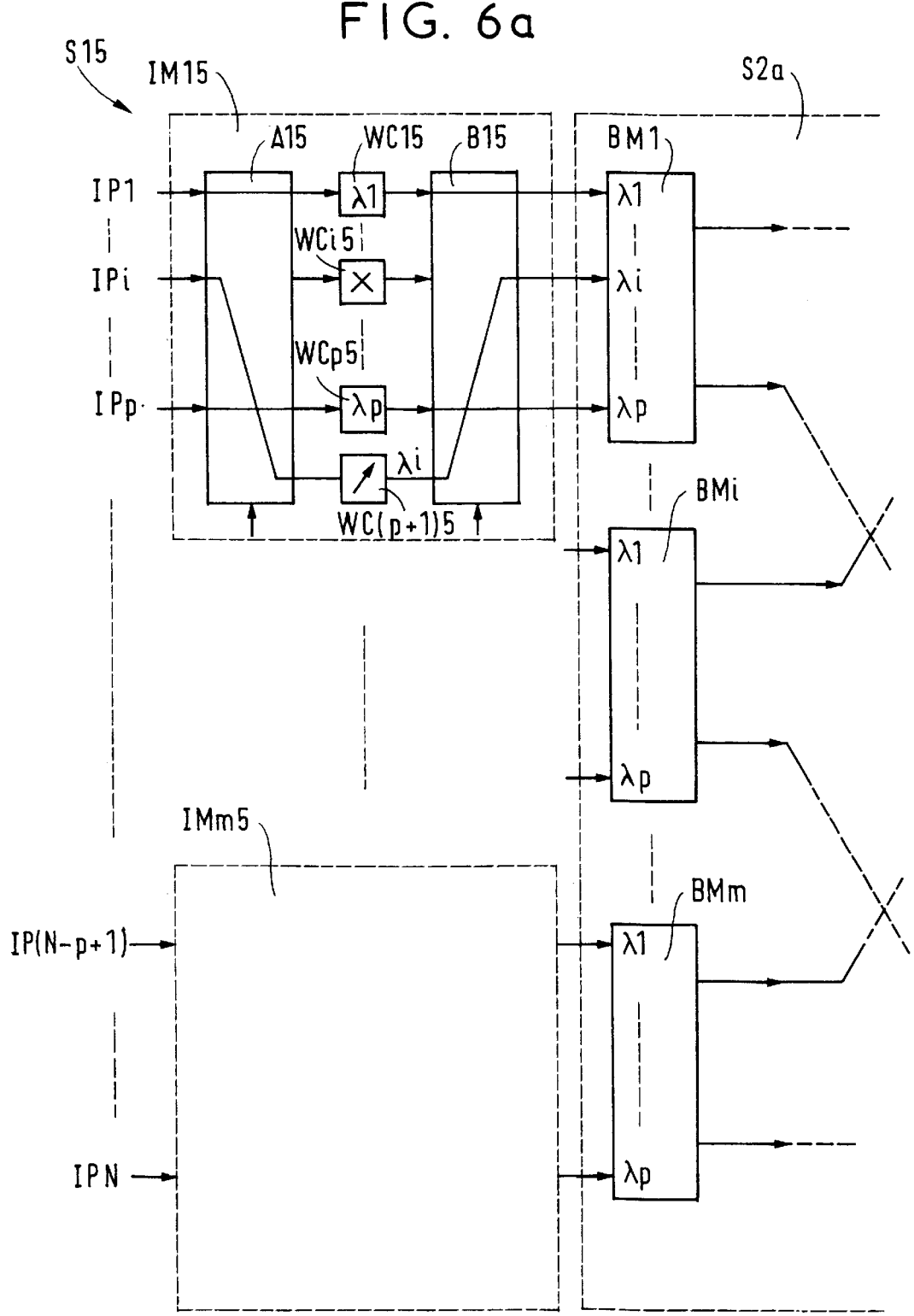
FIGS. 6a and 6b are a more detailed block diagram of a fifth embodiment of that example.
Figure 6B:
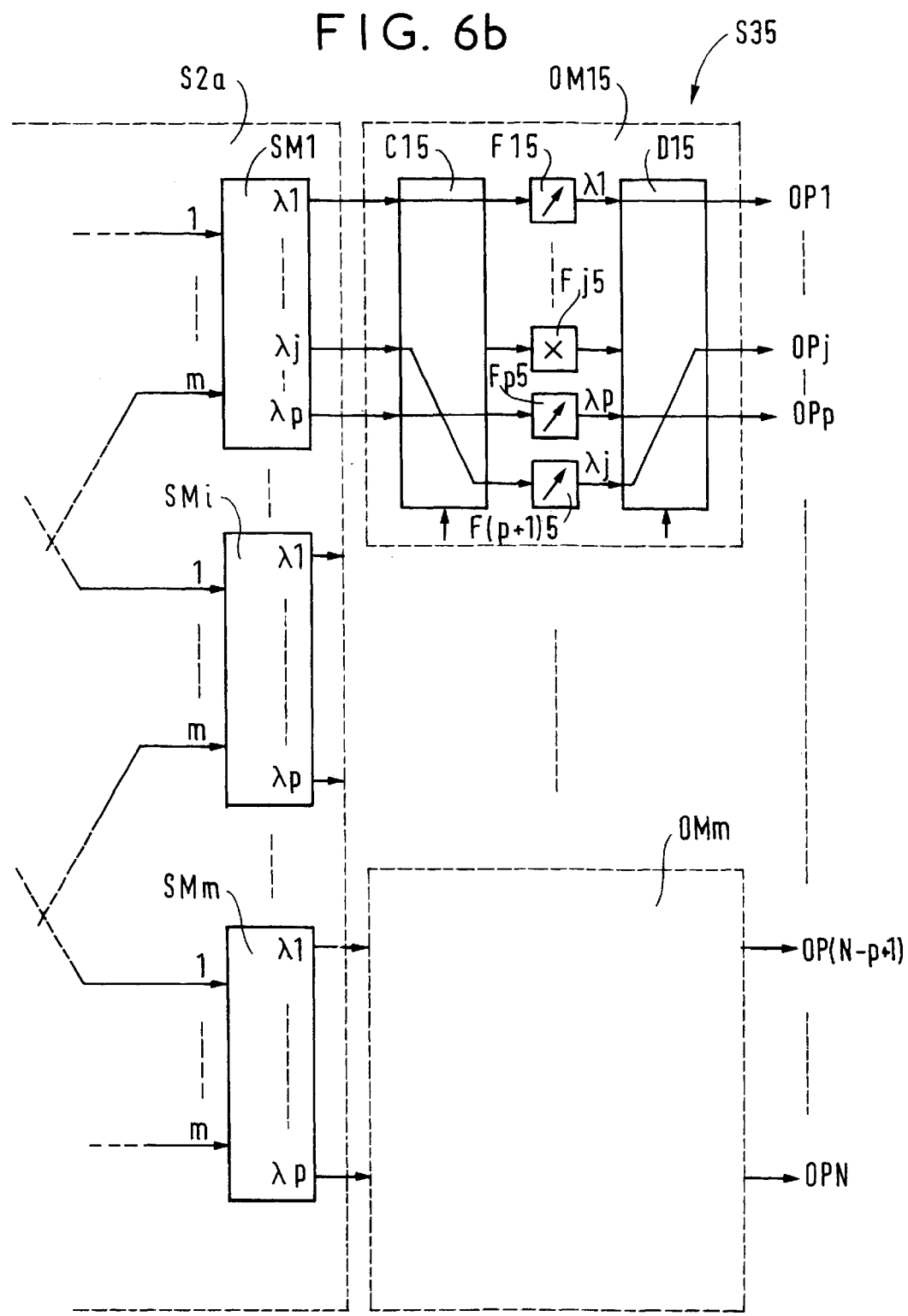

FIGS. 6a and 6b show a more detailed block diagram of a fifth embodiment of the above example, omitting the matrix S2', the group D, the group E and the control platform CP for greater clarity. The matrix S2a constituting the second stage is the same as the one described above.

The first stage S15 of the matrix comprises m identical modules IM15, ..., IMm5. For example, the module IM15 includes:
- an input switch A15 controlled by an electrical signal supplied by the control platform CP, not shown,
- wavelength converters WC15, ..., WCp5 permanently tuned to respective wavelengths $\lambda 1, \ldots, \lambda p$ and a converter WC(p+1)5 which can be tuned to any of those wavelengths under the control of an electrical signal supplied by the control plate CP, and
- an output switch B15 controlled by an electrical signal supplied by the control platform CP, not shown.

The input switch A15 has p inputs and p+1 outputs. The p+1 outputs are connected to p+1 respective inputs of the p+1 wavelength converters WC15, ..., WC(p+1)5. If all the converters WC15, ..., WCp5 are working correctly it is commanded to connect its input k to its output k for k=1 to p.

The converters WC15, ..., WC(p+1)5 have p+1 outputs connected to the p+1 inputs of the switch B15. The outputs which B15 has p outputs connected to the respective p inputs of the module BM1 of the matrix S2a via the group D, not shown. If all the converters W15, ..., WCp5 are working correctly it is commanded to connect its input k to its output k for k=1 to p.

As the redundant converter WC(p+1)5 is tunable, it can be replaced by any of the p working converters WC15, ..., WCp5. If the converter WCi5, for example, fails, the control platform CP commands the switches A15 and 215 to connect the input port IPi to the input of the redundant converter WC(p+1)5 instead of to the input of the failed converter WCi5 and to connect the output i of the switch B15 to the output of the redundant converter WC(p+1)5 instead of to the output of the failed converter WCi5. The control platform CP tunes the redundant converter WC(p+1)5 to the wavelength ki that the failed converter WCi5 was using before it failed.

The third stage S35 comprises m identical modules OM15, ..., OMm5. For example, the module OM15 includes:
- an input switch C15 controlled by an electrical signal supplied by the control platform CP, p1 p+1 filters with wavelengths F15, ..., F(p+1)5 which can be tuned individually under the control of an electrical signal supplied by the control platform CP, and
- an output switch D15 controlled by an electrical signal supplied by the control platform CP.

The input switch C15 has p inputs and p+1 outputs. Its p+1 outputs are connected to p+1 respective inputs of the filters F15, . . . , F(p+1)5. If all the filters F15, Fp5 are working correctly it is commanded to connect its input k to its output k for k=1 to p.

The output switch D5 has p+1 inputs and p outputs, the p outputs constituting the respective output ports OP1, . . . , OPp of the matrix and its p+1 inputs being connected to a respective output of each of the p+1 tunable filters F15, . . . , F(p+1)5. If all the filters F15, . . . , Fp5 are working correctly it is commanded to connect its input k to its output k for k=1 to p.

The filters F15, . . . , Fp5 are tuned to respective wavelengths $\lambda 1, \ldots, \lambda p$ to eliminate noise. There is a redundant filter F(p+1)5 identical to the p working filters F15, . . . , Fp5. If the filter Fj5, for example, fails the control platform CP commands the switches C5 and D5 to connect the output j of the selection module SM1 to the input of the redundant filter F(p+1)5 instead of to that of the failed filter Fj5 and to connect the output j of the switch D5, constituting the output port OP5, to the output of the redundant converter F(p+1)5 instead of to that of the failed filter Fj5.

Figure 7A:
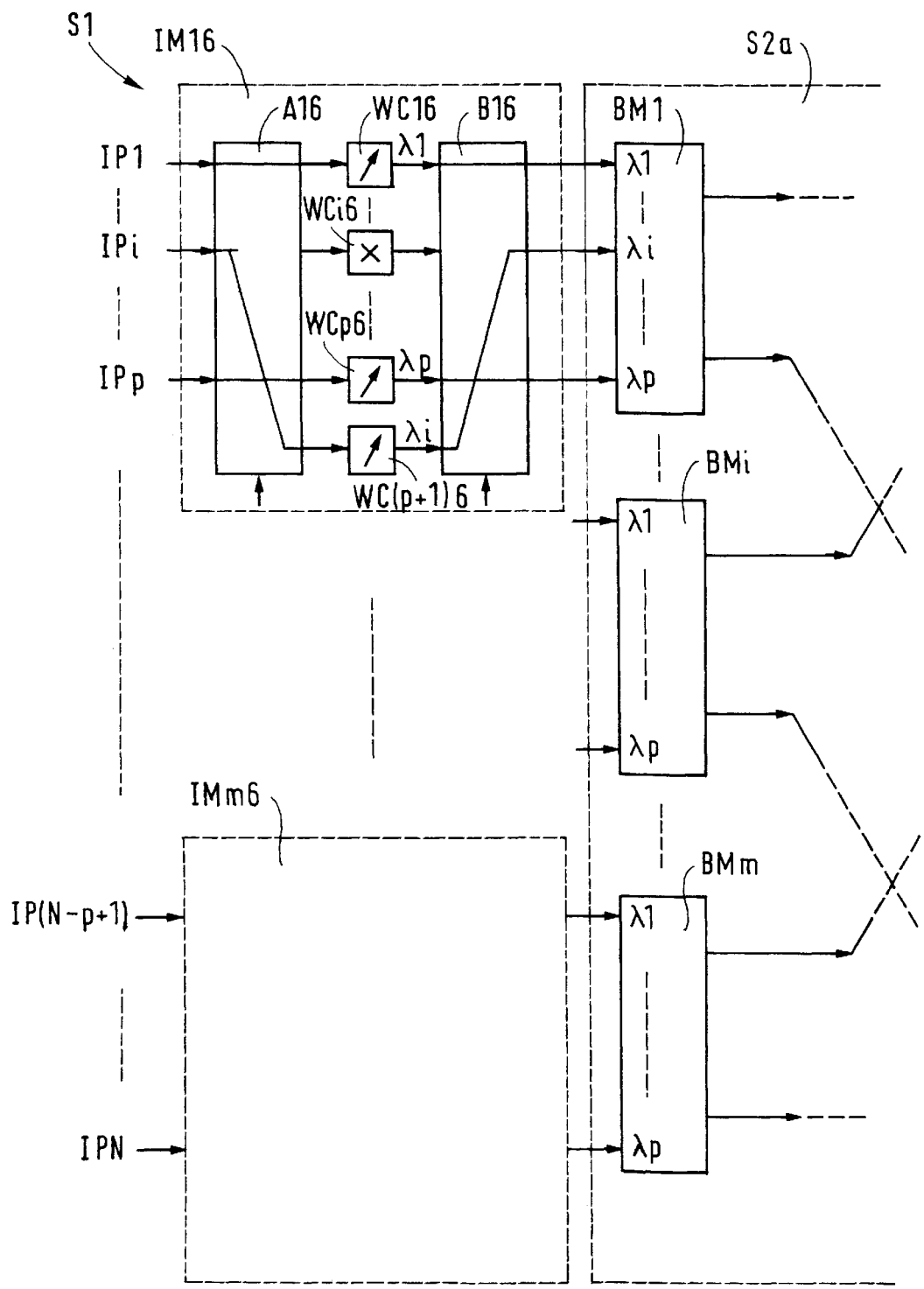
FIGS. 7a and 7b are a more detailed block diagram of a sixth embodiment of that example.
Figure 7B:
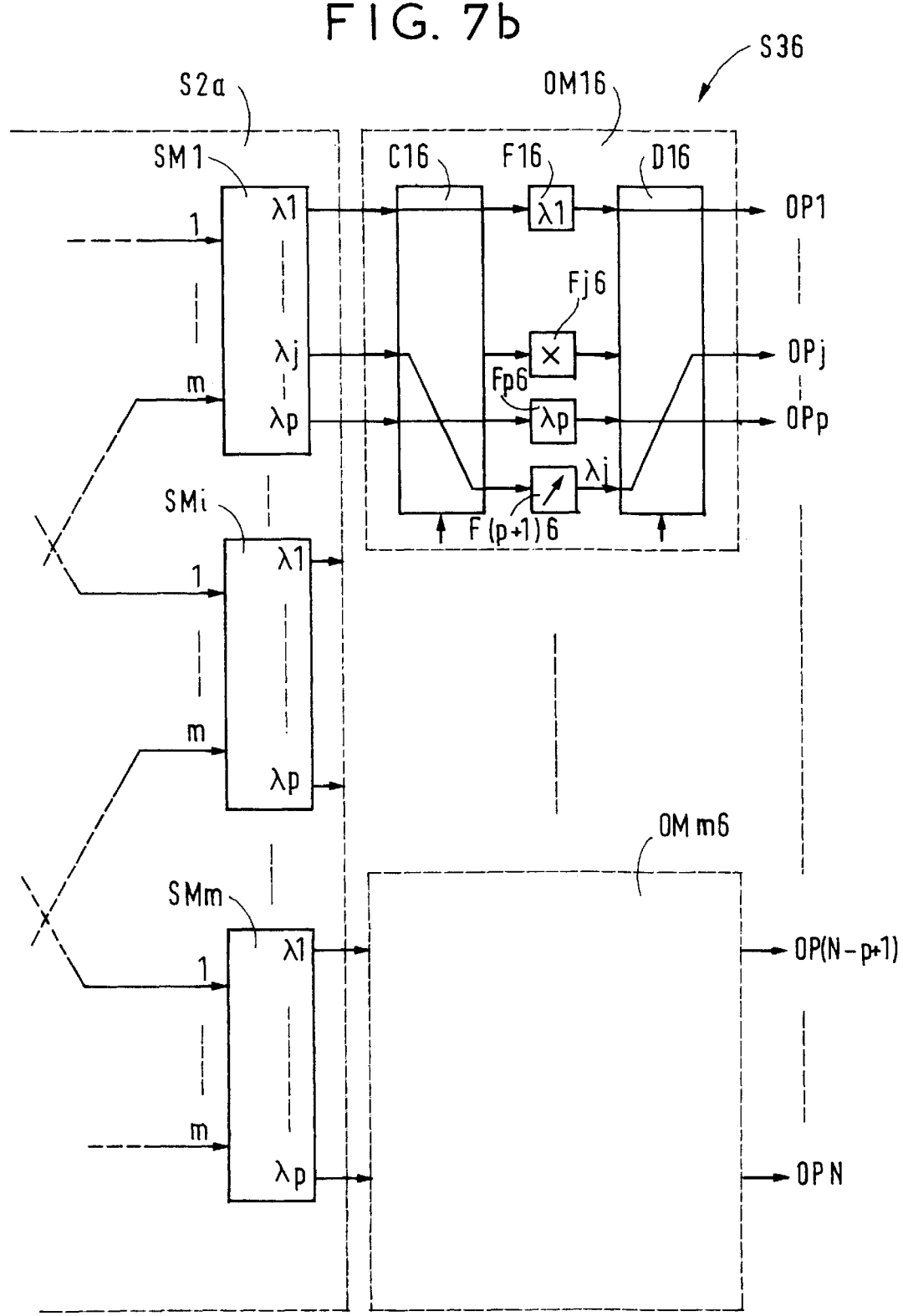

FIGS. 7a and 7b show a more detailed block diagram of a sixth embodiment of the above example, omitting the matrix S2', the group D, the group E and the control platform CP for greater clarity. The matrix S2a constituting the second stage is the same as the one described above.

The first stage S16 of the matrix comprises m identical modules IM16, . . . , IMm6. For example, the module IM16 includes:

an input switch A16 controlled by an electrical signal supplied by the control platform CP, not shown, p+1 wavelength converters WC16, . . . , WC(p+1)6 which can be tuned individually under the control of an electrical signal supplied by the control plate CP, and an output switch B16 controlled by an electrical signal supplied by the control platform CP.

The input switch A16 has p inputs and p+1 outputs. The p+1 outputs are connected to p+1 respective inputs of the p+1 wavelength converters WC16, . . . , WC(p+1)6. If all the converters WC16, . . . , WCp6 are working correctly it is commanded to connect its input k to its output k for k=1 to p.

The tunable converters WC16, . . . , WC(p+1)6 have p+1 outputs connected to the p+1 inputs of the switch B16. The p converters of the same module are tuned to emit p respective different wavelengths $\lambda 1, \ldots, \lambda p$.

The output switch B16 has p+1 inputs and p outputs. Its p outputs are connected to the respective p inputs of the module BM1 of the matrix S2a via the group D, not shown. If all the converters W16, . . . , WCp6 are working correctly it is commanded to connect its input k to its output k for k=1 to p.

There is a redundant converter WC(p+1)6 identical to the p working converters WC16, . . . , WCp6. If the converter WCi2, for example, fails, the control platform CP commands the switches A16 and B16 to connect the input port IPi to the input of the redundant converter WC(p+1)6 instead of to the input of the failed converter WCi6 and to connect the output i of the switch B16 to the output of the redundant converter WC(p+1)6 instead of to the output of the failed converter WCi6. The control platform CP tunes the redundant converter WC(p+1)6 to the wavelength $\lambda i$ that the failed converter WCi6 was using before it failed.

The third stage S36 comprises m identical modules OM16, . . . , OMm6. For example, the module OM16 includes:

an input switch C16 controlled by an electrical signal supplied by the control platform CP, p+1 filters with wavelengths F16, . . . , Fp6 tuned permanently to respectively wavelengths $\lambda 1, \ldots, \lambda p$ to eliminate noise and a converter F(p+1)6 that can be tuned individually under the control of an electrical signal supplied by the control platform CP, and an output switch D16 controlled by an electrical signal supplied by the control platform CP.

The input switch C16 has p inputs and p+1 outputs. Its p+1 outputs are connected to p+1 respective inputs of the filters F16, . . . , F(p+1)6. If all the filters F16, . . . , Fp6 are working correctly it is commanded to connect its input k to its output k for k=1 to p.

The output switch D6 has p+1 inputs and p outputs, the p outputs constituting the respective output ports OP1, . . . , OPp of the matrix and its p+1 inputs being connected to a respective output of each of the p+1 filters F16, . . . , F(p+1)6. If all the filters F16, . . . , Fp6 are working correctly it is commanded to connect its input k to its output k for k=1 to p.

The redundant filter F(p+1)6 can replace any of the p working filters F16, . . . , Fp6 because it can be tuned to any of the wavelengths $\lambda 1, \ldots, \lambda p$. If the filter Fj6, for example, fails the control platform CP commands the switches C6 and D6 to connect the output j of the selection module SM1 to the input of the redundant filter F(p+1)6 instead of to that of the failed filter Fj6 and to connect the output j of the switch D6, constituting the output port OPj, to the output of the redundant converter F(p+1)6 instead of to that of the failed filter Fj6.

What is claimed is:

1. A protected optical switch matrix having N inputs and N outputs and including an optical switching fabric, an input interface performing wavelength conversion and an output interface performing wavelength filtering, wherein the input interface and the output interface are protected by redundancy provided by r redundant units for E working units where r is a number substantially less than E, and the input interface includes at least one group of E working wavelength converters and r redundant converters which are all tuned permanently to the same wavelength.

2. A matrix according to claim 1, whrerein the output interface includes at least one group of E working wavelength filters and r redundant filters which can all be tuned to the same range of wavelengths.

3. A matrix according to claim 1, wherein the input interface includes at least one group of E working wavelength filters and r redundant converters.

4. A matrix according to claim 1, wherein the output interface includes at least one group of E working wavelength filters and r redundant converters.

5. A protected optical switch matrix, comprising:

an input interface configured to receive N inputs and performing wavelength conversion;

an output interface configured to generate N outputs and performing wavelength filtering;

an optical divider coupled between said input interface and a mixed spatial switching matrix; and an optical switcher coupled between said mixed spatial switching matrix and said output interface, wherein said input interface and said output interface comprise a plurality of E working units and a plurality of r redundant units, each of said r redundant units comprising a permanently tuned redundant converter in said input interface and a variable tuning filter in said output interface, and r is substantially less than E.

* * * * *